United States Patent [19]

Tamai et al.

[11] 3,742,035

[45] June 26, 1973

[54] METHOD FOR PREPARATION OF URETHANATED HYDROXYALKANE SULFONATES

[75] Inventors: Iwao Tamai; Kenji Yokoi, both of Ishikawa-shi, Japan

[73] Assignee: Lion Fat & Oil Co., Ltd., Tokyo, Japan

[22] Filed: Dec. 27, 1971

[21] Appl. No.: 212,638

[30] Foreign Application Priority Data
Dec. 26, 1970 Japan.............................. 45/129627

[52] U.S. Cl............................................. 260/482 C
[51] Int. Cl........................................ C07c 125/04
[58] Field of Search .................................. 260/482 C

[56] References Cited
UNITED STATES PATENTS
3,068,278  12/1962  Bernstein et al................ 260/482 C
2,806,051  9/1957   Brockway ....................... 260/482 C Primary Examiner—Henry R. Jiles
Assistant Examiner—Paul J. Killos
Attorney—Woodhams, Blanchard & Flynn

[57] ABSTRACT

Alkane sulfonate carbamates are obtained as the result of reaction conducted between hydroxyalkane sulfonate and urea in an aromatic hydrocarbon solvent.

4 Claims, No Drawings

METHOD FOR PREPARATION OF URETHANATED HYDROXYALKANE SULFONATES

BACKGROUND OF THE INVENTION

The present invention relates to urethanation of hydroxyalkane sulfonates, and more particularly relates to a method for preparing carbamic acid ester expressed by the following general formula, (II) by conducting reaction between hydroxyalkane sulfonate expressed by the following general formula, (I) and urea:

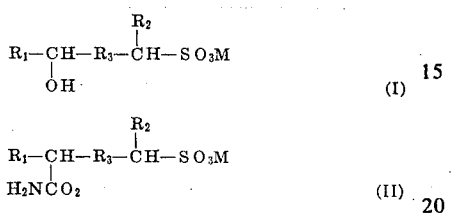

and wherein $R_1$ represents alkyl radical, $R_2$ represents hydrogen or alkyl radical, (but the sum total of carbon atoms possessed by both $R_1$ and $R_2$ is 3 – 21), $R_3$ represents absence or alkylene having one to three carbon atoms, and M represents alkali metal, alkali earth metal, ammonium, or substituted ammonium.

As a rule, when reaction is conducted between alcohols and urea to obtain carbamic acid ester, the reaction temperature should be kept higher than the decomposing point of urea, that is, usually above 120° C, from the reason that it is necessary to induce urea to decomposition first of all.

Moreover, said reaction very often requires a catalyst such as tin chloride, nickel chloride, copper acetate, zinc dust, or vanadium pentoxide.

SUMMARY OF THE INVENTION

The object of the present invention is to provide a method for preparing carbamic acid ester of hydroxy alkane sulfonate, expresses by the foregoing general formula, (II) by means of conducting reaction between hydroxyalkane sulfonate, expressed by the foregoing general formula, (I) and urea at a temperature in the range of 100° – 180° C, preferably 120° – 140° C, within an organic solvent to be inactive on urethanation.

Hydroxyalkane sulfonate applicable to the present invention includes hydroxyalkane sulfonate produced from the preparation process of α-olefin sulfonate too, besides, for instance, such hydroxyalkane sulfonate that is prepared by a synthesizing method, which is described in pp. 2,917 – 2,926, vol 97 of "Chemische Berichte."

So far as it concerns to the quantity of urea to be utilized in the present invention, it should be within the range of 1 : 1.0 – 4.0, preferably 1: 1.2 – 3.0 in the hydroxyalkane sulfonate to urea molar ratio.

The reaction solvent applicable urethanation should be an inert organic solvent and this kind of organic solvent includes benzene, toluene, xylene and mixtures thereof. Urethanation according to the present invention can be performed either the atmospheric pressure, or under the increased pressure; however it should be carried out at a temperature within the range of 100°–180° C, preferably 120° – 140° C. Further, as hydroxyalkane sulfonate itself is possessed of a catalytic activity, so urethanation thereof does not necessarily require presence of catalyst.

Nevertheless, the presence of 0.001 – 5.0 percent by weight of at least one member selected from the group consisting of tin chloride, nickel chloride, copper acetate, zinc dust (blue powder), and vanadium tetraoxide is capable of promoting urethanation more smoothly.

Carbamic acid ester of hydroxy alkane sulfonate obtained from urethanation according to the present invention is possessed of surface activity, so that this compound can be utilized advantageously also as an effective component of a detergent, or an additive thereof.

In addition, when nuclear magnetic resonance spectrum of urethanated product obtained by a method according to the present invention by means of empolying dimethyl sulfoxide as a solvent, a signal from terminal $NH_2$ of urethane, and a signal from methyne radical in the main chain thereof are detected at $\zeta = 3.70$ and $\zeta = 5.43$, respectively.

While, on measuring infrared spectrum thereof, carbonyl and $NH_2$ absorptions are detected at 1,690 – 1,720 cm$^{-1}$ and about 1,610 cm$^{-1}$ respectively, besides said compound indicates sulfonate absorptions.

PREFERRED EMBODIMENTS OF THE INVENTION

The following examples will further illustrate the present invention and enable other skilled in art to understand the invention more completely. It is to be understood, however, that the following examples are not to be construed as limitations on the practice of the invention.

Example 1.

In a 100 ml three-necked flask equipped with reflux condenser, stirrer and thermometer, 9.0 g (0.15 mole) of urea and 17.2 g (0.05 mole) of sodium slat of 3-hydroxyhexadecane sulfonic acid were placed with 50 ml of xylene. The thus obtained mixture was subjected to 20-hours' reflux, and thereafter xylene was distilled out therefrom under the reduced pressure, whereby was resulted a solid matter. Said solid matter was recrystallized twice from water-alcohol, and subsequently element analysis was done against thus obtained crystal, whereby the following results were obtained.

|    | measured value | theoretical value |
|----|----------------|-------------------|
| C: | 52.79%         | 52.71%            |
| H: | 8.82%          | 8.79%             |
| N: | 3.55%          | 3.62%             |

Further, with respect to said crystal, by measuring nuclear magnetic resonance spectrum as well as infrared spectrum by means of empolying dimethyl sulfoxide as a solvent, it was observed that said crystal was possessed of just the same properties as above-mentioned.

EXAMPLE 2.

In 100 ml three-necked flash equipped with reflux condenser, stirrer and thermometer, 6.0 g (0.1 mole) of urea, 0.06 g of stannous chloride and 14.4 g (0.05 mole) of sodium salt of 4-hydroxydodecane sulfonic acid were placed with 50 ml of xylene. The thus obtained mixture was subjected to 15-hours' reflux, and thereafter it was treated in the same way as in Example 1, whereby was obtained urethanated sodium salt of hydroxydodecane sulfonic acid.

The nitrogen analysis conducted by Kjeldahl method proved that purity of this compound was 98.6 percent.

EXAMPLE 3.

In a three-neck flask equipped with reflux condenser, stirrer and thermometer, 60 g (0.1 mole) of urea and 18.0 g (nearly 0.05 mole) of sodium salt of $C_{16}$ α-olefine sulfonic acid (including 55 percent hydroxy sulfonate) were placed with 50 ml of toluene. The thus obtained mixture was subjected to 30-hours' reflux, and thereafter, toluene was distilled out therefrom under reduced pressure.

The nitrogen analysis of the thus obtained urethanated product proved that said product included 50.1 percent of urethanated hydroxy sulfonate.

What is claimed is:

1. A method for urethanation of hydroxyalkane sulfonates expressed by the following general formula, (I), comprising the steps of conducting reaction between said hydroxyalkane sulfonate and urea in an inert organic solvent in the molar ratio of 1 : 1.0 – 4.0 at a temperature within the range of 100° – 180° C; and recovering carbamic acid ester of hydroxy alkane sulfonate expressed by the following general formula, (II) from reaction mixture resulted from said reaction.

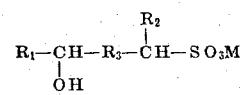
(I)

wherein $R_1$ represents alkyl radical, $R_2$ represents hydrogen or alkyl radical, (but the sum total of carbon atoms possessed by both $R_1$ and $R_2$ is 3 – 21), $R_3$ represents absence or alkylene radical having one to three carbon atoms, and M represents alkali metal, alkali earth metal, ammonium, or substituted ammonium.

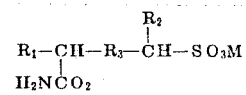
(II)

2. A method for urethanation of hydroxyalkane sulfonates according to claim 1, wherein urethanation is carried out at a temperature within the range of 120° – 140° C.

3. A method for urethanation of hydroxyalkane sulfonate according to claim 1, wherein the hydroxyalkane sulfonate to urea molar ratio is +1 : 1.2 – 3.0.

4. A method for urethanation of hydroxyalkane sulfonates according to claim 1, wherein an inert organic solvent is aromatic hydrocarbon selected from the group consisting of benzene, toluene, xylene and mixtures thereof.

* * * * *